US011952248B1

(12) United States Patent
Yue

(10) Patent No.: US 11,952,248 B1
(45) Date of Patent: Apr. 9, 2024

(54) HYDRAULIC JACK

(71) Applicant: WALTON.K.K International Business Group, Inc., Wellington, FL (US)

(72) Inventor: Qingsheng Yue, Wellington, FL (US)

(73) Assignee: Walton.K.K International Business Group, Inc., Wellington, FL (US)

( * ) Notice: Subject to any disclaimer, the term of this patent is extended or adjusted under 35 U.S.C. 154(b) by 0 days.

(21) Appl. No.: 18/220,066

(22) Filed: Jul. 10, 2023

(51) Int. Cl.
*B66F 3/42* (2006.01)
*B66F 3/26* (2006.01)

(52) U.S. Cl.
CPC .................. *B66F 3/42* (2013.01); *B66F 3/26* (2013.01); *B66F 2700/057* (2013.01)

(58) Field of Classification Search
CPC .... B66F 3/24; B66F 3/247; B66F 3/38; B66F 3/30; B66F 5/04
See application file for complete search history.

(56) References Cited

U.S. PATENT DOCUMENTS 1,524,141 A * 1/1925 Kyle ...................... H01B 17/24 174/162
1,529,580 A * 3/1925 Douglas .................. F16B 39/04 411/513
1,802,965 A * 4/1931 Brady .................... H01B 17/24 174/158 R
6,695,290 B1 * 2/2004 O'Connell ................ B66F 1/06 254/133 R
6,872,039 B2 * 3/2005 Baus ..................... F16B 21/125 411/347
2005/0104050 A1 * 5/2005 Spencer .................... B66F 3/30 254/93 H
2009/0127532 A1 * 5/2009 Yueh ......................... B66F 3/42 254/93 H
2012/0193593 A1 * 8/2012 Weddle ...................... B66F 3/42 254/93 H
2016/0194185 A1 * 7/2016 Rogers, II ................. B66F 3/30 254/108

* cited by examiner

*Primary Examiner* — Tyrone V Hall, Jr.
(74) *Attorney, Agent, or Firm* — Millen, White, Zelano & Branigan P.C.; William F. Nixon

(57) ABSTRACT

A hydraulic jack for providing safety security is disclosed. The hydraulic jack comprises a hydraulic cylinder storing hydraulic fluid inside, and a piston installed in the hydraulic cylinder that is raised up from the hydraulic cylinder by a pressure of the hydraulic fluid stored in the hydraulic cylinder, thereby a heavyweight can be lifted by the piston. The piston has a drill hole on a body thereof that has a determined diameter and is perpendicular to the piston. When the piston is raised up, a safety pin is penetrable through the drill hole to secure the piston in place.

14 Claims, 5 Drawing Sheets

HYDRAULIC JACK

FIELD OF THE INVENTION

The invention relates to a hydraulic jack. More particularly, the present invention relates to a hydraulic jack with safety equipment that provides safety to users when using the hydraulic jack.

DESCRIPTION OF THE RELATED ART

Hydraulic jacks are a type of mechanical devices used to lift heavy-weight objects, such as a vehicle. In the automobile industries, hydraulic jacks are known as a kind of hydraulic car jack. The hydraulic jack is an indispensable repair tool that accompanies the car and is used to lift the car up for easy repair. Traditional hydraulic jacks need to be used with a jack stand to prevent sudden slipping for safety reasons. Because the jack self-generated anti-slip relies on a one-way liquid valve, it is not reliable and there is a possibility of accidents.

In general, a hydraulic jack comprises a large piston and a small piston inside a big hydraulic fluid cylinder and a small hydraulic fluid cylinder, respectively. The big and the smaller cylinders contain hydraulic fluid and are connected together. The small piston forces the fluid to lift the large piston. There are two ball valve that works as a check valve, allowing flow and stop the flow while pumping. With such a hydraulic jack, loads of up to several tons can be lifted. The force of a hydraulic jack can be calculated with pascal's law. More details of a general hydraulic jack will be described in the section of the Detail Description of Preferred Embodiments with reference to FIGS. 3 and 4.

As the car hydraulic jack can lift up to several-ton heavyweight, the federal Occupational Safety and Health Administration (OSHA) has setup standards applicable to levers and ratchets, screws, and the hydraulic jacks. The most common hazard associated with jack use is collapse from trying to lift beyond the capacity of the jack, jack placement on uneven surfaces, and a load slipping off the jack. Therefore, a hydraulic jack should be complemented with a jack stand when being put under a car before a user start working under the cru.

However, even with a jack stand, it is still not completely safe to users. Therefore, a new design of the hydraulic jack that provide more secured safety is desirable.

There are patented products on the market that place the jack stand side by side with the hydraulic jack by welding, the problem of which is that it is bulky and inconvenient to carry.

SUMMARY OF THE INVENTION

An embodiment of a hydraulic jack with a safety device is disclosed. The hydraulic jack includes a hydraulic cylinder storing hydraulic fluid inside, a piston installed in the hydraulic cylinder that is raised up from the hydraulic cylinder by a pressure of the hydraulic fluid stored in the hydraulic cylinder, wherein the piston is used to lift up a heavyweight, and wherein the piston has a through hole on a body thereof, the through hole has a determined diameter and is perpendicular to the piston.

The hydraulic jack further comprises a safety pin that is used to access through the through hole of the piston when the piston is raised up for securing the piston in place.

An embodiment of a hydraulic jack including safety equipment is further disclosed. The hydraulic jack includes a hydraulic cylinder storing hydraulic fluid inside, a piston installed in the hydraulic cylinder that is raised up from the hydraulic cylinder by a pressure of the hydraulic fluid stored in the hydraulic cylinder, wherein the piston is used to lift up a heavyweight, and wherein the piston has a through hole on a body thereof, the through hole has a determined diameter and is perpendicular to the piston, and a safety pin for inserting into the through hole when the piston is raised up to secure the piston in place.

The hydraulic jack further includes a bracket mounted on an exterior wall of the hydraulic cylinder. The bracket comprises a pair of support plates arranged surrounding the piston. Each of the support plates has a through hole. When in use, the through holes of the bracket are aligned with the through hole of the piston, and the safety pin penetrates the through hole of one support plate, the through hole of the piston, and the through hole of the other support plate so as to secure the piston in place.

Another embodiment of a hydraulic jack with safety equipment is further disclosed. The hydraulic jack includes a hydraulic cylinder storing hydraulic fluid inside, a piston installed in the hydraulic cylinder that is raised up from the hydraulic cylinder by a pressure of the hydraulic fluid stored in the hydraulic cylinder, wherein the piston is used to lift up a heavyweight, and wherein the piston has a through hole on a body thereof, the through hole has a determined diameter and is perpendicular to the piston, a safety pin for inserting into the through hole when the piston is raised up to secure the piston in place, and at least one bracket mounted on an exterior wall of the hydraulic cylinder, wherein the bracket comprises a pair of supporting plates arranged in a parallel manner and surrounding the piston, each of which has a through hole; when in use, the through holes of the supporting plates are aligned with the through hole of the piston, and the safety pin penetrates the through holes of the bracket and the through hole of the piston to secure the piston in place.

The above embodiments further comprise a small piston and a lever for controlling a movement of the small piston, wherein the small piston is smaller than the piston, the small piston is pulled up and pushed down by the lever, with the up-and-down movements of the small piston, the hydraulic fluid in the hydraulic cylinder is pressurized to provide a great force to raise up the piston, thereby the heavyweight is lifted up.

Further, the above embodiments comprise at least one spiral screw for tightening the safety pin toward the piston after the safety pin penetrates the through hole of the piston to provide more security.

The safety pin may be attached to an extension cord that is mounted on the exterior wall of the hydraulic jack.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

Figure 1:
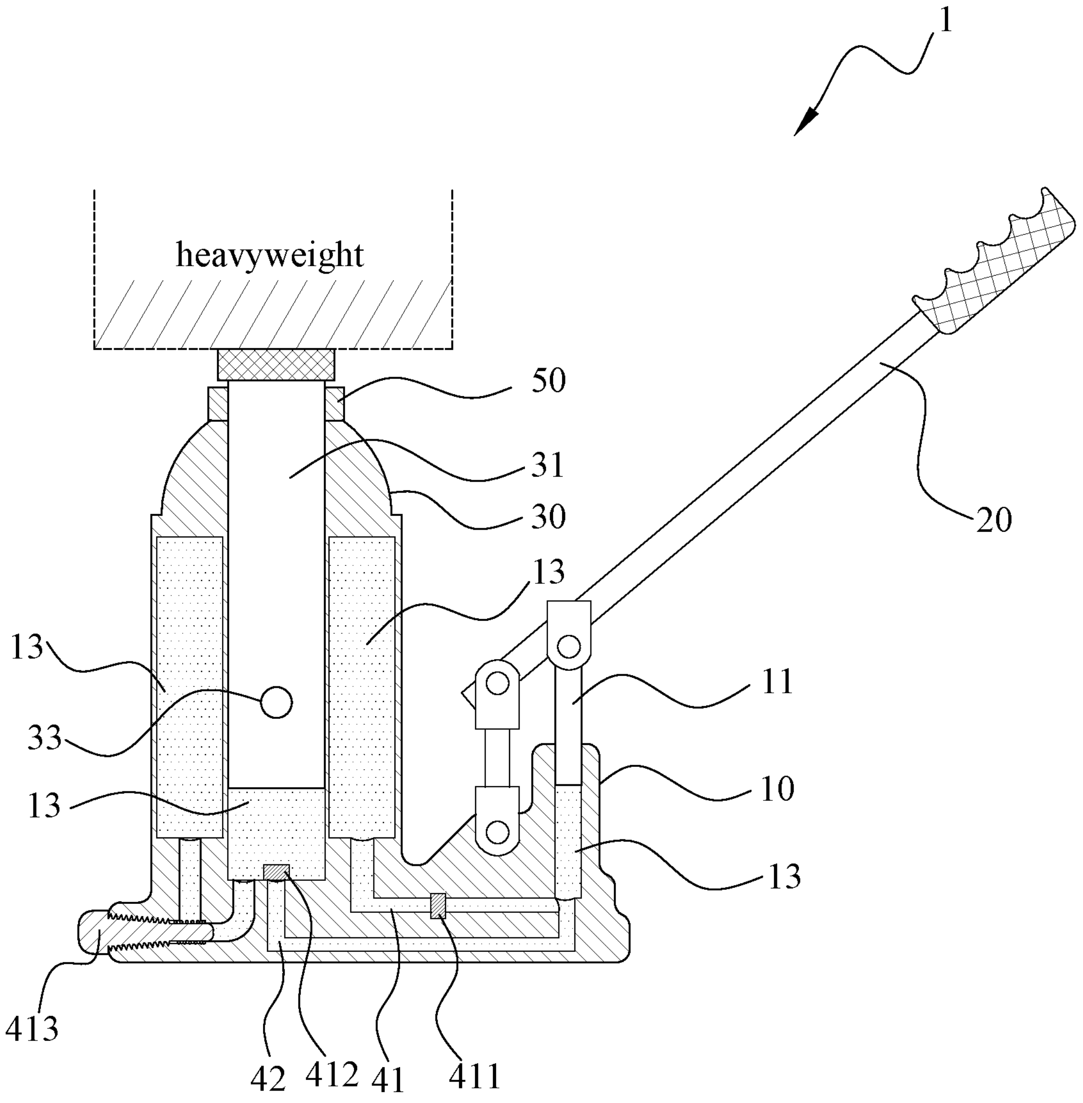
FIG. 1 is a schematic diagram of a hydraulic jack in accordance with the disclosed embodiments.
Figure 2:
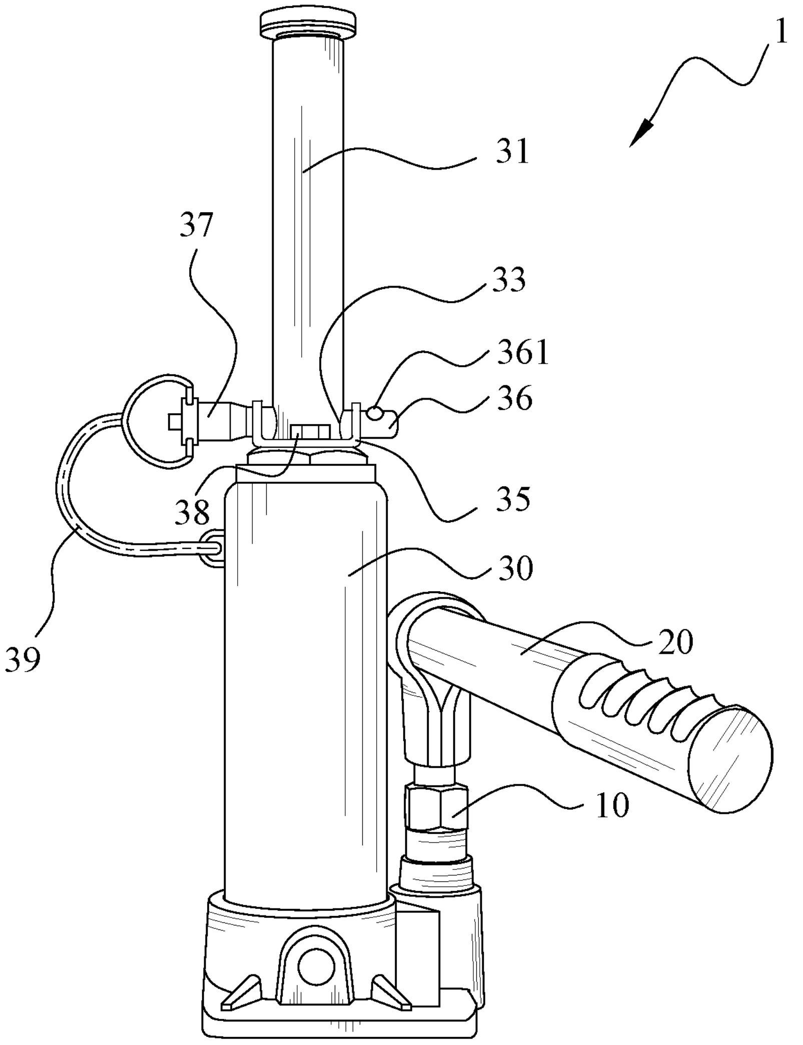
FIG. 2 illustrates a partial sectional-view diagram of the hydraulic jack in accordance with the preferred embodiments.
Figure 4:
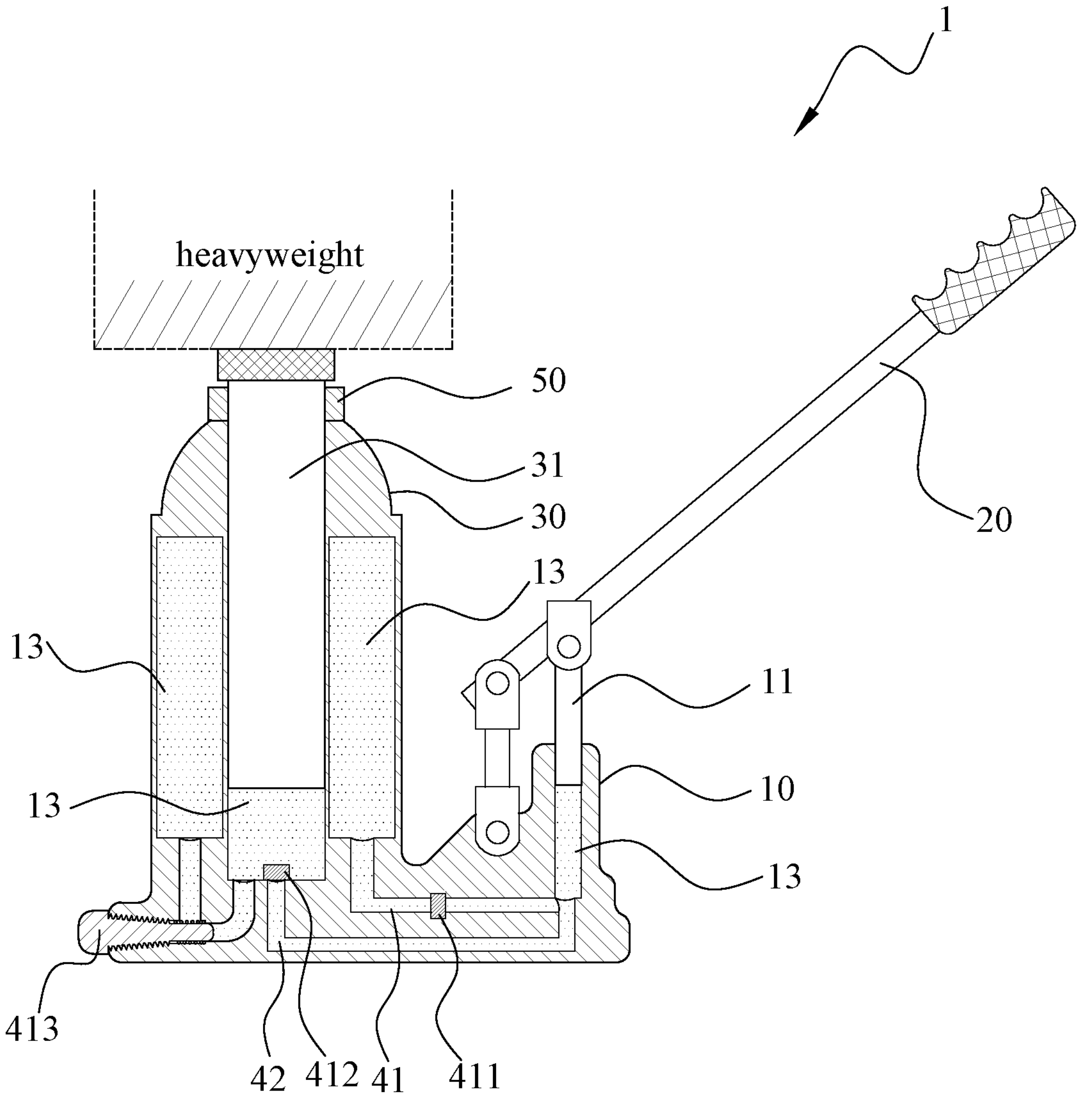
FIG. 4 is schematic diagram of a conventional hydraulic jack used in the industry.
Figure 5:
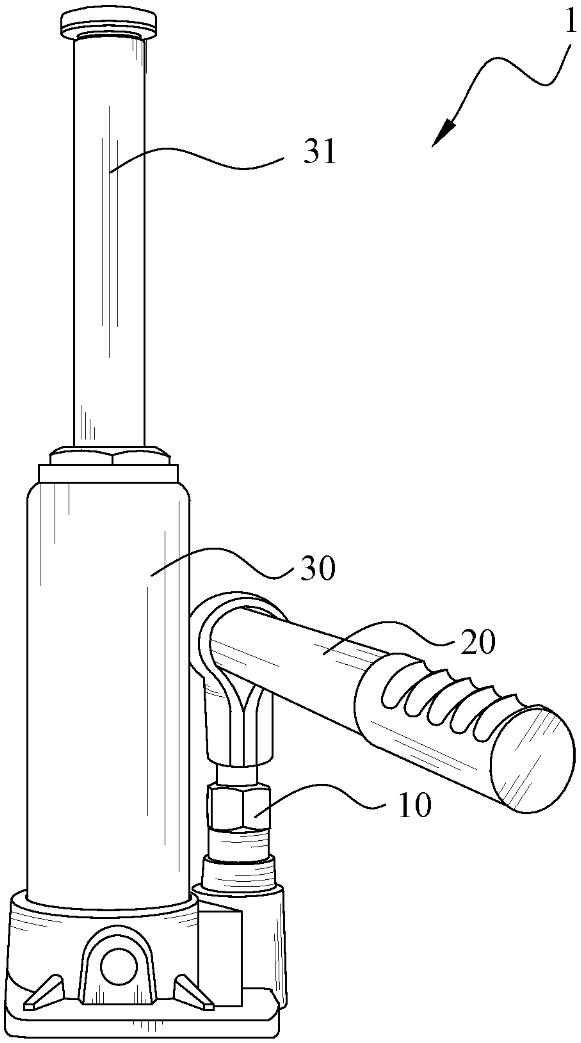
FIG. 5 illustrates a partial sectional-view diagram of the hydraulic jack of FIG. 4.

FIG. 1 is a schematic diagram of a hydraulic jack 1 in accordance with the preferred embodiments. It is noted that the hydraulic jack shown in FIG. 1 is a bottle hydraulic jack and is for exemplary purposes only. Different type of hydraulic jack 1 may also be used. To understand how a hydraulic jack works, FIG. 4 illustrates a partial section diagram of a conventional hydraulic jack 4 used in the industry. FIG. 2 shows a partial section diagram of hydraulic jack 1 in accordance with the preferred embodiments. FIGS. 2 and 4 show that the interior of hydraulic jack 1 of the preferred embodiments is similar to the conventional hydraulic jack 4, except that large piston 31 has a drill hole on the body with a suitable diameter that is perpendicular to the large piston. FIG. 5 also shows a schematic diagram of a general hydraulic jack 4 used in the industry.

Figure 3:
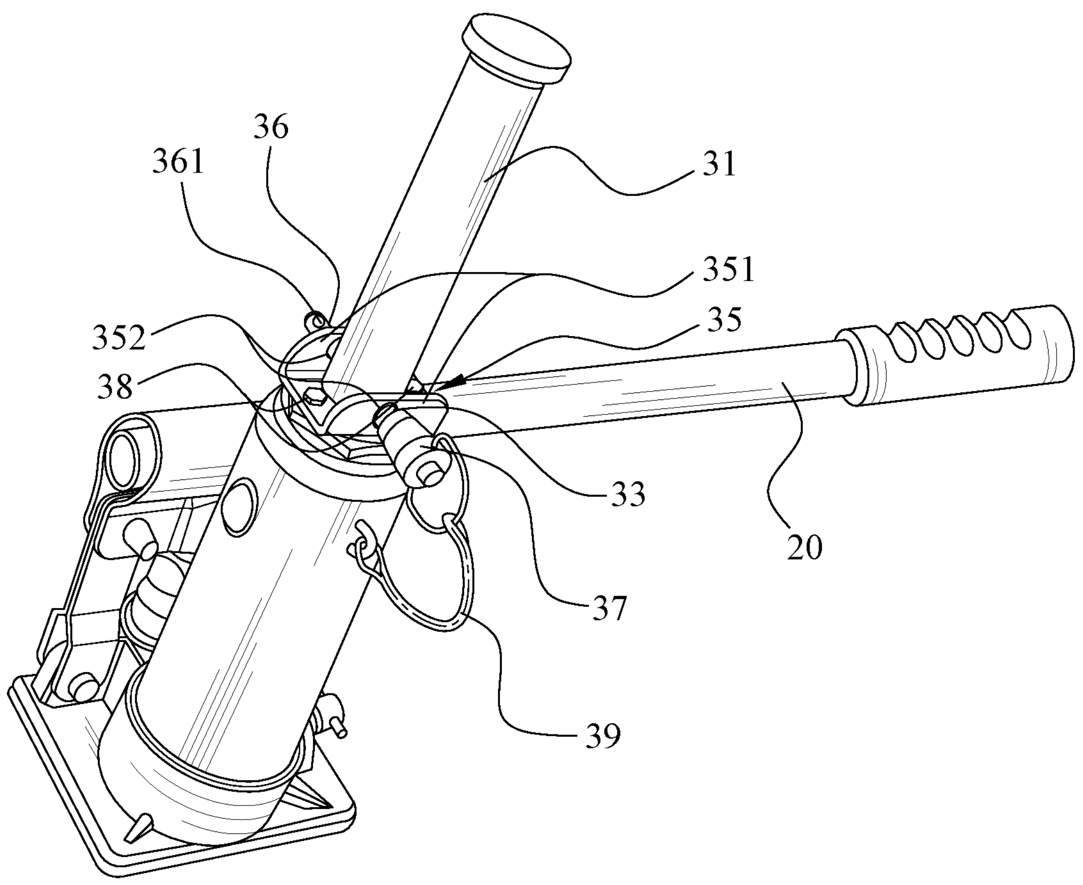
FIG. 3 illustrates another view of the hydraulic jack of FIG. 1 in accordance with the preferred embodiments.

The detailed description of the preferred embodiments starts with explaining how a hydraulic jack generally works by referring to FIGS. 3 and 4. In the followings, similar elements of the conventional hydraulic jack 4 shown in FIG. 4 and the hydraulic jack 1 shown in FIG. 1 of the preferred embodiments will be marked as same reference numbers for the purpose of brevity.

FIG. 4 illustrates a partial sectional diagram of a general hydraulic jack 4 used in the industry. As shown, hydraulic jack 4 comprises a small hydraulic cylinder 10 and a large hydraulic cylinder 30. Small piston 11 and large piston 31 are installed inside small hydraulic cylinder 10 and large hydraulic cylinder 30, respectively. Hydraulic fluid is filled in reservoir 13 between the small hydraulic cylinder 10 and large hydraulic cylinder 30 and flows between the two cylinders through fluid channel 41 and fluid channel 4:2. By pressuring the hydraulic fluid by small piston 11 (or pump piston or pump plunger) it will move large piston 31 upward with a great force.

Lever 20 is used to control the movement of small piston 11 of small hydraulic cylinder 10. Small piston 11 is extendable outwardly from small hydraulic cylinder 10 by the control of lever 20. Large piston 31 is also extendable outwardly from the top of large hydraulic cylinder 30 by a force generated from small piston 1L In general, small piston 11 may also be called as a pump piston or a pump plunger and large piston 31 may be called working piston, A single-direction valve 411 and a single-direction valve 412 are installed in fluid channels 41 and 42, in which valve 411 of fluid channel 41 is opened to allow the hydraulic fluid to flow into reservoir 13 of small hydraulic cylinder 10 when lever 20 is lifted up; while at the same time, valve 412 of fluid channel 42 is closed, Valve 411 of fluid channel 41 is closed and valve 412 of the fluid channel 42 is opened to allow the fluid channel to flow into reservoir 13 of large hydraulic cylinder 30 when lever 20 is pushed down. The down force of lever 20 moves small piston 11 downwardly to pressurize hydraulic fluid 13, thereby moving large piston 31 upward with great force. With such a hydraulic jack, loads of up to several tons can be lifted. The increase in force is in an due to the Pascal principle, which is well-known in the skilled art.

The valves 411 and 412 of fluid channels 41 and 42 may be in a form of a ball. During the upward movement of the small piston 11 (i.e. pump piston or pump plunger), the hydraulic oil is sucked into the small cylinder 10 (or called pump cylinder). After the inflow, the ball in the large hydraulic cylinder 30 (or called working cylinder) falls down due to gravity. The high pressure in the working cylinder presses the ball firmly into a valve seat, thus preventing the hydraulic oil from flowing back into the pump cylinder. The pumping process can now start again from the beginning, as the ball in the pump cylinder is lifted by the suction and hydraulic fluid can be sucked into the pump cylinder. Note that due to check valves (not shown), the hydraulic oil in the working cylinder is kept permanently under pressure, while the oil in the reservoir always remains unpressurized.

The above cycles will be repeated several times until the heavyweight on the top of large hydraulic cylinder 30 is lifted to a determined distance. To lower the large piston again, a release valve 413 is opened, which connects large hydraulic cylinder directly to reservoir 13. During lifting, this passage may be sealed with a steel ball (not shown) which is pressed firmly into release valve 413 with a screw. If release valve 413 is unscrewed, the ball releases the passage and the hydraulic oil is pushed back into reservoir 13 under the force of gravity.

In order to protect jack 4 from damage in the event of overload, release valve 413 is designed as a safety valve and is usually provided with a spring. If the pressure is too high, the spring is pushed back and the hydraulic oil can flow directly back into the reservoir without an unacceptably high pressure building up in the working cylinder.

Hydraulic jack 4 may further include a ram that is install on the top of large hydraulic cylinder 30 on the circumference of large piston 31.

FIGS. 1-2 show a schematic diagram and a partial sectional-view diagram of hydraulic jack 1 in accordance with the preferred embodiments. As described above, the interior design of hydraulic jack 1 of FIG. 2 is similar to conventional hydraulic jack 4 of FIG. 4, The important features, however, of hydraulic jack 1 includes a drill hole 33 on large piston 31 that has a suitable diameter and is perpendicular to large piston 31. The location of drill hole 33 has no limitation based on the location of the pin bolt and a maximum force of pressurized hydraulic fluid pushed by small piston 11, as long as it is on a plane perpendicular to large piston 31.

FIG. 1 shows the schematic diagram of hydraulic jack 1 in accordance with the preferred embodiments. In FIG. 1, a safety pin or a pin bolt 36 is secured on a wall of large hydraulic cylinder 30, which is used to penetrate through drill hole 33 when the large piston 31 is raised. The purpose of safety pin 36 is to prevent large piston 31 from abruptly and unexpectedly slipping down based on an operation error or a malfunction of the valves of hydraulic fluid channels 41 and 42 or the heavyweight lifted by jack 1 is too heavy so as to avoid an accident.

Hydraulic jack 1 further includes a bracket 35 that is mounted to the top of the exterior wall of large hydraulic cylinder 30. FIG. 3 is another view of hydraulic jack in accordance with the preferred embodiments to show the detailed structure of bracket 35. In FIG. 3, brackets 35 include a pair of supporting plates 351 surrounding large piston 31. Each of the pair of supporting plate 351 has a through hole 352. Through holes 352 are located on positions so that when large piston 31 is raised up, they are in aligned with drill hole 33 of large piston 31. Once through holes 352 and drill hole 33 are aligned, safety bolt 36 is able to penetrate in the order of hole 352 of bracket 35, drill hole 33, and hole 352 of bracket 35 to secure large piston 31 in place. After use of hydraulic jack 1, safety pin 36 is pulled out from drill hole 33 and holes 351 and large piston 31 then will return to a stowed state after opening release valve 413.

The design of brackets 35 provides additional security to avoid sudden collapse of large piston 31, but not essentially necessary in accordance with the preferred embodiments. In some embodiments, bracket 35 can be omitted. The shape of bracket 35, however, is not limited to that shown in FIG. 3. Different shapes of supporting brackets can also be used. Hydraulic jack 1 of the preferred embodiment may also include spiral screw 37 that screws to safety pin 36 toward large piston after safety pin 36 spans into bracket 35 and penetrates through drill hole 33 to provide more security.

As described above, conventionally, a hydraulic jack should be complemented with a Jack stand when being put under a car before a user start working under the car. However, there is no guarantee that the jack stand provides 100 percentage safety to the users. Therefore, safety pin 36 and bracket 35 according to the preferred embodiments are designed to provide further safety to users when using a hydraulic jack to lift up a heavy-weight object. In the case that the large piston slips unexpectedly, it will be stopped by safety pin 36 and will not further slide down, thereby an accident can be avoided.

The preferred embodiment of FIG. 1 illustrates that safety pin 36 is attached to chain 39 that is mounted on the wall of hydraulic jack 1. However, safety pin 36 is not limited to be attached to chain 39. For example, safety pin 36 may be a separate part. Safety pin 36 and brackets 35 can also be a set sold separately from hydraulic jack 1. The form and shape of brackets 35 are also not limited to the design shown in FIG. 3. Any form and shape that provides similar functions of brackets 35 can also be used. In some preferred embodiments, safety pin 36 may have a slope to facilitate the safety pin access to brackets 35 and drill hole 33 of large piston 31.

In the preferred embodiment of FIG. 3, bracket 35 is mounted integrally on large hydraulic jack 30 by casting, welding, or hammering. As shown in FIG. 3, bracket 35 may also be a separate piece that is screwed to large hydraulic jack 30 by at least one 38 or attached to large hydraulic jack 30 in any appropriate manner. In an alternative embodiment, a fixed frame (not shown) can be used to attach to large hydraulic cylinder 30. The fixed frame may be formed by casting, welding, and hammering.

In some embodiments, safety pin 36 may have a bullet bean 361 (see FIG. 3) that is extended out after safety pin 36 in inserted into drill hole 31 to prevent safety pin from falling off drill hole 31.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A hydraulic jack, comprising:

a hydraulic cylinder storing hydraulic fluid inside;

a piston installed in the hydraulic cylinder that is raised up from the hydraulic cylinder by a pressure of the hydraulic fluid stored in the hydraulic cylinder, wherein the piston is used to lift up a heavyweight; and wherein the piston has a through hole on a body thereof, the through hole has a determined diameter and is perpendicular to the piston; and a bracket mounted on a top of an exterior wall of the hydraulic cylinder, wherein the bracket is mounted on the top of the exterior wall of the hydraulic cylinder by a fastening device, and comprises two parallel supporting plates surrounding the piston, each of which has a through hole, and wherein when in use, the through holes of the supporting plates are aligned with the through hole of the piston after the piston is raised up.

2. The hydraulic jack of claim 1, further comprising a safety pin that is used to access through the through hole of the piston when the piston is raised up for securing the piston in place.

3. The hydraulic jack of claim 1, further comprising a safety pin that is used to penetrate the through holes of the bracket and the through hole of the piston for securing the piston in place.

4. The hydraulic jack of claim 1, wherein the bracket is a fixed piece and is fastened on the exterior wall of the hydraulic cylinder by welding, casting or hammering.

5. The hydraulic jack of claim 1, wherein the fastening device comprises at least one screw and the bracket is detachable from the hydraulic cylinder.

6. The hydraulic jack of claim 1, further comprising a small piston and a lever for controlling a movement of the small piston, wherein the small piston is smaller than the piston, the small piston is pulled up and pushed down by the lever, with the up-and-down movements of the small piston, the hydraulic fluid in the hydraulic cylinder is pressurized to provide a great force to raise up the piston, thereby the heavyweight is lifted up.

7. The hydraulic jack of claim 2, further comprising at least one spiral screw at an end of the safety pin for tightening the safety pin toward the piston after the safety pin penetrates the through hole of the piston to provide more security.

8. The hydraulic jack of claim 2, wherein the safety pin is attached to an extension cord that is mounted on the exterior wall of the hydraulic jack.

9. The hydraulic jack of claim 8, further comprising a small piston and a lever for controlling a movement of the small piston, wherein the small piston is smaller than the piston, the small piston is pulled up and pushed down by the lever, with the up-and-down movements of the small piston, the hydraulic fluid in the hydraulic cylinder is pressurized to provide a great force to raise up the piston, thereby the heavyweight is lifted up.

10. A hydraulic jack, comprising:

a hydraulic cylinder storing hydraulic fluid inside;

a piston installed in the hydraulic cylinder that is raised up from the hydraulic cylinder by a pressure of the hydraulic fluid stored in the hydraulic cylinder, wherein the piston is used to lift up a heavyweight, and wherein the piston has a through hole on a body thereof, the through hole has a determined diameter and is perpendicular to the piston;

a safety pin for inserting into the through hole when the piston is raised up to secure the piston in place; and a bracket mounted on a top of an exterior wall of the hydraulic cylinder, wherein the bracket is mounted on the top of the exterior wall of the hydraulic cylinder by a fastening device, and comprises two parallel supporting plates surrounding the piston, each of which has a through hole, and wherein when in use, the through holes of the supporting plates are aligned with the through hole of the piston after the piston is raised up, and wherein the safety pin penetrates the through holes of the bracket and the through hole of the piston for securing the piston in place.

11. The hydraulic jack of claim 10, wherein the safety pin is attached to an extension cord that mounted on an exterior wall of the hydraulic cylinder.

12. The hydraulic jack of claim 10, further comprising at least one spiral screw for tightening the safety pin toward the piston after the safety pin penetrates the through hole of the piston to provide more security.

13. The hydraulic jack of claim 10, wherein the bracket is a fixed piece and is fastened on the exterior wall of the hydraulic cylinder by casting, welding, and hammering.

14. The hydraulic jack of claim 10, wherein the fastening device comprises at least one screw and the bracket is detachable from the hydraulic cylinder.

* * * * *